J. B. HALL.
GREASE CUP.
APPLICATION FILED FEB. 24, 1912.

1,027,538.

Patented May 28, 1912.

WITNESSES

INVENTOR
James B. Hall
By Chas. E. Riordon
Attorney

UNITED STATES PATENT OFFICE.

JAMES B. HALL, OF CLEVELAND, OHIO.

GREASE-CUP.

1,027,538.   Specification of Letters Patent.   Patented May 28, 1912.

Application filed February 24, 1912. Serial No. 679,783.

*To all whom it may concern:*

Be it known that I, JAMES B. HALL, a citizen of the United States, residing at Cleveland, in the county of Cuyahoga and State of Ohio, have invented certain new and useful Improvements in Grease-Cups, of which the following is a full, clear, and exact specification.

This invention relates to grease cups for containing a supply of hard or solid lubricant and has for its object the provision of a cheap and simple device by which a continuous flow of the lubricant to the member to be lubricated will be automatically maintained; said invention being designed as an improvement upon my prior invention covered by United States Letters Patent No. 784395 issued March 7, 1905.

The invention is illustrated in the accompanying drawings and will be hereinafter fully described, the novel features being subsequently pointed out in the appended claims.

Figure 1:
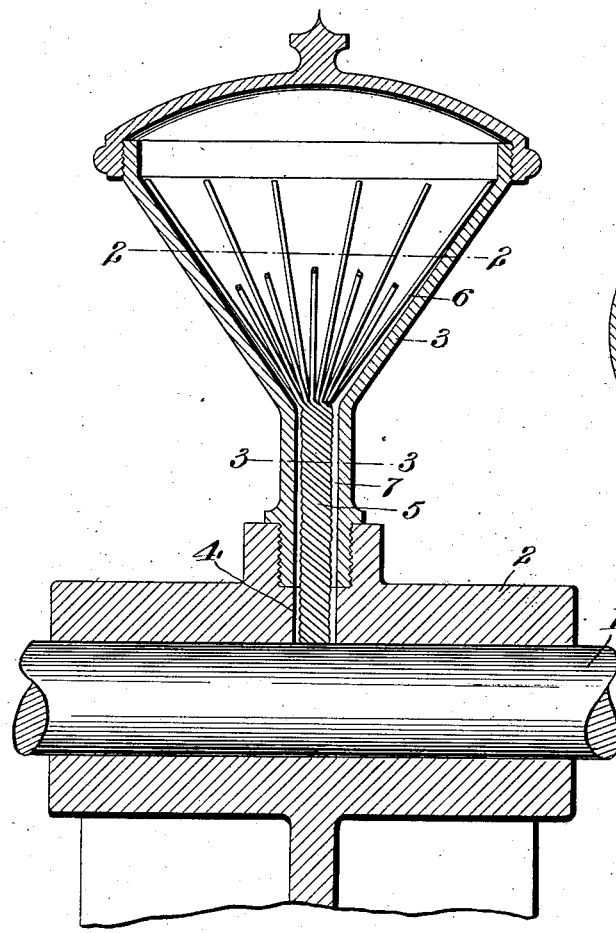
Figure 2:
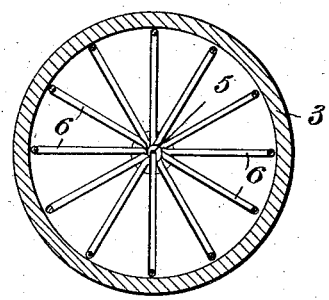
Figure 3:
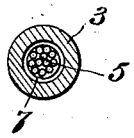

In the drawings; Figure 1 is a vertical section of a grease cup in position upon a bearing and having my invention applied thereto; Fig. 2 is a horizontal section taken on the line 2—2 of Fig. 1; and Fig. 3 is a similar view taken on the line 3—3 of Fig. 1.

In the drawings; 1 designates a shaft or other rotating member journaled in a bearing 2 in which is secured a grease cup 3, preferably of the tapered or conical form shown, an opening 4 being provided in the bearing in alinement with the discharge passage of the cup to permit the lubricant to pass from the cup to the shaft. These parts may be of any well known construction.

My invention is an improved feeder consisting of a stem 5 adapted to pass through the discharge nipple of the cap and rest on the shaft and a plurality of antennæ 6 extending divergently from the upper end of the stem. In the preferred embodiment of the invention, I construct the stem of a plurality of fine copper or other heat conducting wires or metals twisted or otherwise secured together for a portion of their lengths, as clearly shown in Fig. 1, the untwisted portions of the wires being left free to diverge or radiate from the stem and form the antennæ. The number of wires will depend upon the size of the cup in which the feeder is to be used as the stem should be of such size as to leave a channel or annular space 7 between itself and the wall of the discharge passage for the flow of the lubricant. It will be understood, of course, that the free portions of the wires extend in all directions to the top of the cup and lie close to the body of the same. The wires are flexible and may be given any configuration so that they will conform to the shape of the cup.

The lubricant is placed in the basket or holder, presented by the antennæ or free portions of the wires, through the top of the cup. As the shaft rotates, the heat generated in the bearing will pass up through the conductors and melt the outer portion of the grease, the melted grease passing down through the channel 7 to the shaft. As the surface of the cake of grease melts, the remainder of the cake will drop by gravity toward the stem and this action will be facilitated by the jarring of the feeder due to the rotation of the shaft under the lower end of the stem. The wires constituting the feeder conduct heat generated by the friction of the rotating shaft directly to the lubricant and, as the lubricant is supported by the wires, the entire body of the lubricant will be subjected to the melting influence and the entire body will be gradually fed to the shaft in a continuous flow, the rapidity of the flow being determined by the heat generated in the bearing and thus automatically adapted to the needs of the bearing. The ends of the wires being free and disconnected, they offer no obstruction to the entrance or movement of the lubricant and as they extend the full length of the cup they will apply heat to the entire surface of the grease which consequently melts from the outside of the grease inward toward the center and will move downwardly upon the wires automatically as it is consumed. No packing, forcing or other attention, therefore, is needed after the lubricant is placed in the cup.

While I have herein referred specifically only to the heat generated by the friction of the shaft, it is to be understood that the stem of the feeder may be so disposed as to be subjected to other heating influences, and I do not desire to be limited to the specific form herein shown and described, as various modifications may be made without departing from the spirit and scope of the invention.

Having thus fully described my invention what I claim as new and desire to secure by Letters Patent is:—

1. A feeder for grease cups for solid lubricant consisting of a plurality of wires secured together for a portion of their lengths to form a supporting stem and having their untwisted portions free and extending divergently from the upper end of the stem to conform to the outline of the grease cup and support the lubricant.

2. In a grease cup the combination with the outer casing, of a grease receptacle or basket comprising a plurality of wires secured together at one of their ends to form a supporting stem and having their free ends extending divergently therefrom, said basket being arranged in said casing with its diverging portions resting snugly against the interior wall of the casing, substantially as and for the purpose set forth.

In testimony whereof I have signed my name to this specification in the presence of two subscribing witnesses.

JAS. B. HALL.

Witnesses:
JOSEPHINE M. KELLY,
JOHN H. RARESHIDE.

Copies of this patent may be obtained for five cents each, by addressing the "Commissioner of Patents, Washington, D. C."